United States Patent [19]

Schudt

[11] Patent Number: 5,076,323

[45] Date of Patent: Dec. 31, 1991

[54] ELECTROMAGNETIC VALVE

[75] Inventor: Klaus Schudt, Nordheim, Fed. Rep. of Germany

[73] Assignee: Robert Bosch GmbH, Stuttgart, Fed. Rep. of Germany

[21] Appl. No.: 579,934

[22] Filed: Sep. 7, 1990

[30] Foreign Application Priority Data

Nov. 16, 1989 [DE] Fed. Rep. of Germany ....... 3938136

[51] Int. Cl.⁵ .......................................... F15B 13/044
[52] U.S. Cl. ......................... 137/596.17; 251/129.14; 251/129.21
[58] Field of Search .............. 137/596.17; 251/129.14, 251/129.21

[56] References Cited

U.S. PATENT DOCUMENTS

| 2,868,494 | 1/1959 | Kearns et al. | 251/129.14 X |
| 3,820,757 | 6/1974 | Siebel | 251/129.21 |
| 4,086,889 | 5/1978 | Yagi et al. | 137/596.17 X |
| 4,338,966 | 7/1982 | Smith | 137/596.17 |
| 4,501,299 | 2/1985 | Klimowicz et al. | 251/129.21 X |
| 4,790,351 | 12/1988 | Kervagoret | 137/596.17 |
| 4,998,559 | 3/1991 | McAuliffe | 137/596.17 |

FOREIGN PATENT DOCUMENTS

| 543767 | 5/1956 | Italy | 137/596.17 |
| 469852 | 8/1975 | U.S.S.R. | 137/596.17 |

Primary Examiner—Gerald A. Michalsky
Attorney, Agent, or Firm—Michael J. Striker

[57] ABSTRACT

An electromagnetic valve for controlling fluid flow to and from a load includes a valve stem movable, upon excitation of an armature, to lift a valve body from a first valve seat against pressure of a pressure fluid to enable flow of the pressure fluid to the load. The valve stem has a blocking portion remote from the valve body and which is lifted from a second valve seat located adjacent to the armature, in an unexcited condition of the armature, by the valve body to enable flow of fluid from the load past the second valve seat through at least one bore formed in the armature, to a reservoir.

2 Claims, 1 Drawing Sheet

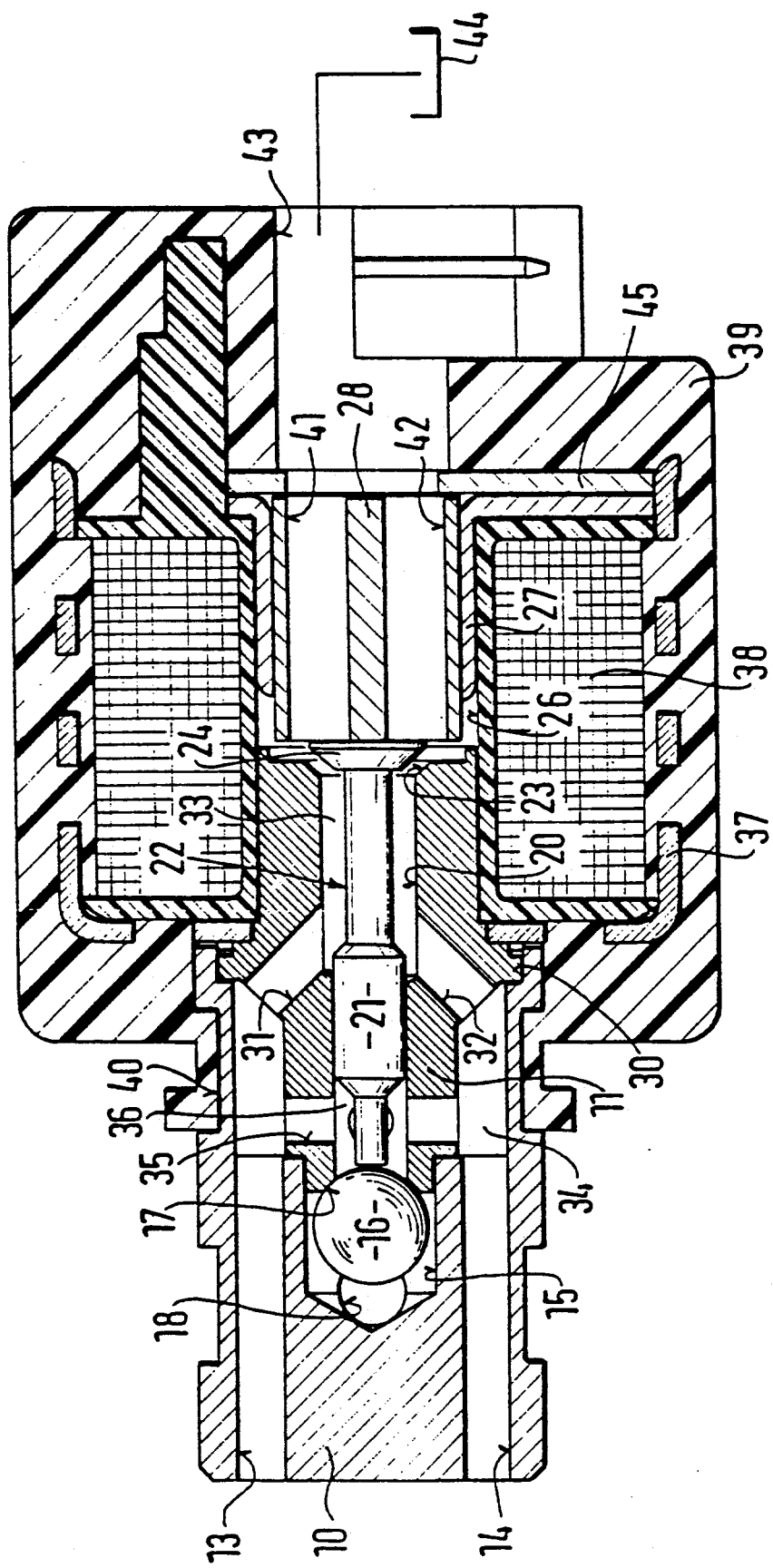

ELECTROMAGNETIC VALVE

BACKGROUND OF THE INVENTION

The present invention relates to an electromagnetic valve in which a valve stem is moved by an armature to lift a valve body of a valve seat against pressure of a pressure fluid to enable flow of the pressure fluid to a load. The drawback of such a valve consists in that the pressure fluid may cause an unauthorized opening of the valve. Besides such a valve requires a spring which can easily be damaged.

SUMMARY OF THE INVENTION

The object of the invention is an electromagnetic valve which does not open whatever large the pressure of the pressure fluid may be, and which does not require a spring. Another object of the invention is an electromagnetic valve in which the valve power requirement especially well corresponds to the existing direction of action of the magnetic force. Yet another object of the invention is a relatively simple construction of the magnetic valve.

The object of the invention is achieved by providing an electromagnetic valve that includes a second valve seat located adjacent to the armature, by providing the valve stem at an end thereof remote from the valve body with a blocking portion which, in an unexcited condition of the armature, is lifted off the second valve seat so that fluid from the load can flow past the second valve seat through a bore formed in the armature to a reservoir.

The present invention both as to its construction so to its method of operation, together with additional objects and advantages thereof, will be best understood from the following detailed description of the specific embodiment when read in connection with the accompanying drawing.

BRIEF DESCRIPTION OF THE DRAWINGS

The single FIGURE of the drawing shows a longitudinal cross-sectional view of an electromagnetically actuatable valve according to the invention.

DETAILED DESCRIPTION OF THE PREFERRED EMBODIMENTS

The valve of the invention shown in the FIGURE, comprises a partially hollow connection element 10 that receives a valve insert 11. The valve insert 11 abuts against a shoulder of the connection element 10. The connection element 10 has two longitudinal bores 13 and 14 and a blind bore 15. A spherical valve body 16 is located with a play in the bore 15. The seat 17 for the valve body 16 is formed by an end surface of the valve insert 11. A transverse connection bore 18 opens into the bottom portion of the bore 15. The connection bore 18, which does not intersect the longitudinal bores 13 and 14, is connected by a conduit (not shown) with a pump.

The valve insert 11 has a central bore 20, a stem 22 having an enlarged portion. It is displaceable in the central bore 20 which is coaxial with the bore 15. The bore 20 at an end thereof remote from the valve body 16, defines a spherical seat 23 of a end surface of the valve insert 11. The stem 22 at an end thereof adjacent to the seat 23, has a spherical blocking portion 24 cooperating with the spherical seat 23. A cylindrical armature 28 of the valve is located in a longitudinal bore 26 of a sheet member 27 slightly spaced from the seat 23. The armature 28 extends coaxially with the stem 22 and the valve body 16.

The valve insert 11 has in the middle thereof a flange-like widening 30 in which there are formed two oblique bores 31 and 32 opening in a ring space 33. The ring space 33 is defined by the inner surface of the insert 11 defining the bore 20, and the stem 22. The ring space 33 communicates with the seat 23. A ring space 34 is formed between the valve insert 11 in the region adjacent to the flange-like widening 30, and the connection element 10. The longitudinal bores 13 and 14 as well as oblique bores 31 and 32 open into the ring space 34. Spaced from the seat 17, there are formed, in the valve insert 11, four transverse bores 35, of which only one is designated. The four transverse bores 35, which have the same diameter, open into a ring space 36 located upstream of the seat 17. An end of the connection element 10 adjacent to the armature 28 abuts a sheet member 37 formed by deep drawing and which houses coil 38 of the electromagnet. The inner side of the coil 38 lies against the outer side of the sheet member 37 and against the outer surface of the valve insert 11. These parts are secured, by injection of a plastic material, in a housing 39 which also encloses electrical connection elements (not shown). The housing 39 has a ring portion 40 that surrounds the connection element 10 and holds it in a predetermined position.

The armature 28 has two longitudinal bores 41 and 42 communicating at their opposite ends with the seat 23 and a central cavity 43 in the housing 39, respectively. The cavity 43 communicates with a reservoir 44. A sheet plate 45 located in the housing 39 forms a rear support for the armature 28.

In the absence of current, the valve body 16 is pressed against the seat 17 by pressure fluid that flows through the bore 18, and blocks thereby fluid supply. At the same time, the stem 22 is pressed by the valve body 16 in such a manner that the blocking portion 24 of the stem 22 is lifted from the valve seat 23. The armature 28 is kept in its end position by the stem 22. The pressure fluid can only flow from a load (not shown) through bores 13 and 14 into the ring space 34 and therefrom, through the oblique bores 31 and 32 into the ring space 33. From the ring space 33, the fluid flows, past the valve seat 23, into bores 41 and 42 in the armature and therefrom into the cavity 43 and the reservoir 44.

Upon actuation of the electromagnet, the armature 28 is attracted by a pole formed by the upper portion of the valve insert, and biases the blocking portion 24 of the stem 22 against the valve seat 23. Simultaneously, the valve body 16 is lifted from its seat by the stem 22. At that, the fluid flow past the valve seat 23 into the bores 41 and 42 and to the reservoir 44 is interrupted. The pressure fluid from the transverse bore 18 can now flow past the valve seat 17 into the ring space 36 and therefrom through the transverse bore 35 into the ring space 34. From the ring space 34, the pressure fluid flows, through the bores 13 and 14, to the load.

The advantage of the electromagnetic valve according to the invention consists in its simple construction in which few parts are only used. That substantially reduces a possibility for disturbance. Besides, the large cross-section of flow channels of the valve results in its high flow capacity. Particularly advantageous is that the armature, because of longitudinal bores formed therein, has a small mass whereby it is achieved that the valve has a small reaction time. The valve can also be controlled as in pulse-width modulation mode so in pressure modulation mode. Another advantage consists in that both seats 17 and 23 are formed on the same part, namely, the valve insert 11. Therefore, only one outer surface should be worked to optimize the seat wear.

While the invention has been illustrated and described as embodied in an electromagnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An electromagnetic valve for controlling fluid flow to and from a load, comprising a first valve seat; a valve body movable into engagement with said first valve seat by a pressure fluid acting thereon; a valve stem movable to lift said valve body of said first valve seat against pressure of the pressure fluid to enable flow of the pressure fluid to the load; an armature excitable to provide for movement of said valve stem in a first direction in which said valve stem lifts said valve body of said first valve seat, said armature having at least one internal longitudinal bore communicating with a fluid reservoir; and a second valve seat located adjacent to said armature, said valve stem having a blocking portion located at an end of said valve stem remote from said valve body and cooperating with said second valve set; said valve stem, in an unexcited condition of said armature being displaced in a second direction, opposite to said first direction, in which said blocking portion is lifted off said second valve seat to enable flow of fluid from the load past said second valve seat into said at least one internal longitudinal bore in said armature and therefrom to the reservoir; and said electromagnetic valve further comprising a member for guiding said valve stem in its movement, said member defining a pole of an electromagnet of said electromagnetic valve, and a connection element, said member being received in said connection element, and said connection element being provided with a conduit means for communicating said electromagnetic valve with the load, said first and second valve seats being formed on said member so that only one outer surface need be worked to optimize seat wear.

2. An electromagentic valve as set forth in claim 1, wherein said armature includes a plurality of longitudinal bores communicating with the reservoir.

* * * * *